United States Patent
Koehler et al.

(10) Patent No.: US 8,184,891 B2
(45) Date of Patent: May 22, 2012

(54) IMAGING SYSTEM, IMAGING METHOD AND COMPUTER PROGRAM FOR IMAGING A REGION OF INTEREST

(75) Inventors: Thomas Koehler, Norderstedt (DE); Roland Proksa, Hamburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 610 days.

(21) Appl. No.: 12/445,761

(22) PCT Filed: Oct. 12, 2007

(86) PCT No.: PCT/IB2007/054153
§ 371 (c)(1),
(2), (4) Date: Apr. 16, 2009

(87) PCT Pub. No.: WO2008/047279
PCT Pub. Date: Apr. 24, 2008

(65) Prior Publication Data
US 2010/0239188 A1 Sep. 23, 2010

(30) Foreign Application Priority Data
Oct. 18, 2006 (EP) ..................................... 06122515

(51) Int. Cl.
*G06K 9/00* (2006.01)

(52) U.S. Cl. .............. 382/131; 378/21; 378/23; 378/27; 600/425

(58) Field of Classification Search .................. 382/131; 378/21–27; 600/425
See application file for complete search history.

(56) References Cited

U.S. PATENT DOCUMENTS

| 3,924,129 | A | * | 12/1975 | LeMay | 382/131 |
| 4,135,247 | A | * | 1/1979 | Gordon et al. | 378/11 |
| 4,580,219 | A | * | 4/1986 | Pelc et al. | 382/131 |
| 4,680,709 | A | * | 7/1987 | Srinivasan et al. | 378/14 |
| 6,108,575 | A | * | 8/2000 | Besson | 600/425 |
| 2002/0186871 | A1 | * | 12/2002 | Grass et al. | 382/131 |

(Continued)

FOREIGN PATENT DOCUMENTS

WO 2004044848 A1 5/2004

(Continued)

OTHER PUBLICATIONS

Heuscher, D., et al.; Redundant data and exact helical cone-beam reconstruction; 2004; Phys. Med. Biol.; 49:2219-2238.

(Continued)

*Primary Examiner* — Wesley Tucker
*Assistant Examiner* — Mark Roz (57) ABSTRACT

The present invention relates to an imaging system for imaging a region of interest comprising an illumination unit and a detection unit. The imaging system further comprises a grouping unit for grouping the detection values, wherein each group comprises at least one alpha detection value and at least one beta detection value (103). At least one alpha aperture weighting value for the at least one alpha detection value of a group is determined by using at least one position of at least one ray within the aperture (104). Furthermore, at least one beta aperture weighting value for the at least one beta detection value of a group is approximately determined using the at least one alpha aperture weighting value of the group (105). The detection values are than aperture weighted using aperture weighting values (106). The region of interest is reconstructed by backprojecting the weighted detection values (107).

10 Claims, 4 Drawing Sheets

U.S. PATENT DOCUMENTS

| | | |
|---|---|---|
| 2004/0076265 A1 | 4/2004 | Heuscher et al. |
| 2006/0159327 A1* | 7/2006 | Kohler et al. .............. 382/131 |
| 2008/0193003 A1* | 8/2008 | Shechter ................. 382/131 |

FOREIGN PATENT DOCUMENTS

| | | |
|---|---|---|
| WO | 2004066215 A1 | 8/2004 |

OTHER PUBLICATIONS

Koken, P., et al.; Aperture weighted cardiac reconstruction for cone-beam CT; 2006; Phys. Med. Biol.; 51:3433-3448.

La Riviere, P., et al.; Transmission Image Reconstruction and Redundant Information in SPECT with Asymmetric Fanbeam Collimation; 2001; IEEE; pp. 194-198.

Manzke, R., et al.; Adaptive temporal resolution optimization in helical cardiac cone beam CT reconstruction; 2003; Med. Phys.; 30(12)3072-3080.

Matej, S., et al.; Fourier-based reconstruction for fully 3-D PET: optimization of interpolation parameters; 2005; Radiology and Nuclear Medicine; 5 pages.

Rohe, R. C., et al.; The spatially-variant backprojection point kernel function of an energy-subtraction Compton scatter camera for medical imaging; 1997; IEEE Trans. on Nuclear Science; 44(6)2477-2482.

* cited by examiner

IMAGING SYSTEM, IMAGING METHOD AND COMPUTER PROGRAM FOR IMAGING A REGION OF INTEREST

FIELD OF THE INVENTION

The present invention relates to an imaging system, an imaging method and a computer program for imaging a region of interest. The invention further relates to an image generation device, an image generation method and a computer program for generating an image of a region of interest.

BACKGROUND OF THE INVENTION

Known imaging systems comprise an illumination unit for generating a cone beam for illuminating the region of interest from different directions and a detection unit for generating detection values from the cone beam after having traversed the region of interest.

These known imaging systems further comprise a reconstruction unit for reconstructing the region of interest by backprojecting the generated detection values. Before the detection values are backprojected, an aperture weighting of the detection values is performed. This aperture weighting reduces the artifacts caused by the cone angle of the cone beam, but it requires a large computational cost and a considerable amount of hardware resources.

SUMMARY OF THE INVENTION

It is an object of the present invention to provide an imaging system, an imaging method and a computer program for imaging a region of interest, wherein the computational cost for the aperture weighting and the required amount of hardware resources are reduced. It is an further object of the invention to provide a corresponding image generation device, image generation method and computer program for generating an image of a region of interest.

In a first aspect of the present invention an imaging system for imaging a region of interest is presented, comprising:
  an illumination unit for generating a cone beam for illuminating the region of interest from different directions,
  a detection unit for generating detection values from the cone beam after having traversed the region of interest,
  a grouping unit for grouping detection values from different directions, wherein each group comprises at least one alpha detection value and at least one beta detection value,
  an alpha determination unit for determining at least one alpha aperture weighting value for the at least one alpha detection value of a group, using at least one position of at least one ray within the aperture, which corresponds to the at least one alpha detection value,
  a beta determination unit for approximately determining at least one beta aperture weighting value for the at least one beta detection value of a group using the at least one alpha aperture weighting value of the group,
  an aperture weighting unit for aperture weighting the detection values using the determined at least one alpha and at least one beta aperture weighting values,
  a reconstruction unit for reconstructing the region of interest by backprojecting the weighted detection values.

The terms "alpha" and "beta" are used only to distinguish different detection values, determination units and aperture weighting values.

The detection values are values which depend on the radiation of the cone beam after having traversed the region of interest.

The invention is based on the idea that detection values are grouped into at least one alpha detection value and at least one beta detection value, wherein for the at least one alpha detection value at least one alpha aperture weighting value is determined using at least one position of a ray within the aperture, for example, by using known aperture weighting procedures, and wherein for the at least one beta detection value at least one beta aperture weighting value is approximately determined using the at least one alpha aperture weighting value, i.e. for determining the at least one beta aperture weighting value positions of rays within the aperture, which correspond to the at least one beta detection value, are not determined. This reduces the computational cost required for determining the at least one beta aperture weighting value and, therefore, the overall computational cost for determining the aperture weighting values. Furthermore, this reduces the hardware resources required for aperture weighting.

It is preferred that the grouping unit is adapted such that each group comprises at least two alpha detection values and at least two beta detection values. In this case, for each alpha detection value of a group an alpha aperture weighting value is determined by the alpha determination unit using positions of rays within the aperture, which correspond to the at least two alpha detection values. These determined alpha aperture weighting values are than used to approximately determine beta aperture weighting values for the beta detection values of the respective group by the beta determination unit.

It is preferred that the imaging system comprises a redundant detection values determination unit for determining redundant detection values, wherein the grouping unit is adapted for grouping the detection values such that the determined redundant detection values are distributed over several groups. The aperture weighting procedure is particularly time-consuming, i.e. requires a particularly high computational cost, if during the aperture weighting procedure redundant detection values have to be considered. This computational cost can be effectively reduced by grouping the detection values such that the determined redundant detection values are distributed over several groups.

In an embodiment, the imaging system comprises a redundant detection value determination unit for determining redundant detection values, wherein the alpha determination unit is adapted for determining an alpha aperture weighting value for an alpha detection value in accordance with following steps:
  determining redundancy values which are redundant to the alpha detection value,
  determining positions of redundancy rays, which correspond to the alpha detection value and the redundancy values,
  assigning an aperture weighting value to each of the alpha detection value and the redundancy values with respect to the determined positions of the redundancy rays,
  normalizing the assigned aperture weighting values, the normalized aperture weighting value assigned to the alpha detection value being the alpha aperture weighting value for the alpha detection value. These steps yield alpha aperture weighting values which, if they are used in accordance with the invention, yield high quality reconstructed images, while the overall computational cost of the aperture weighting is still strongly reduced in comparison to known aperture weighting procedures.

It is further preferred that the alpha determination unit is adapted for assigning an aperture weighting value by using an aperture weighting function, wherein the aperture weighting function is defined such that to alpha detection values and redundancy values in the middle of the aperture larger aperture weighting values are assigned and that to the outermost alpha detection values and redundancy values with respect to the aperture smaller aperture weighting values are assigned. Since the rays in the middle of the aperture, i.e. since the alpha detection values and redundancy values, which correspond to rays in the middle of the aperture, have a smaller cone angle than the outermost rays, i.e. than the alpha detection values and redundancy values, which correspond to these outermost rays with respect to the aperture, the artifacts generated by alpha detection values and redundancy values in the middle of the aperture are supposed to be smaller than the artifacts of the outermost alpha detection values and redundancy values with respect to the aperture. Therefore, the proposed aperture weighting function improves the aperture weighting and, thus, the quality of the finally reconstructed image.

It is further preferred that to the outermost alpha detection values and redundancy values with respect to the aperture zero is assigned. It is further preferred that to the alpha detection values and redundancy values in the middle of the aperture the largest aperture weighting value is assigned.

In an embodiment, the grouping unit is adapted such that each group comprises at least two alpha detection values and wherein the beta determination unit is adapted for determining the at least one beta aperture weighting value of a group by interpolation using the alpha aperture weighting values of the group. The determination of the beta aperture weighting values by interpolation allows to further reduce the computational cost of the determination of the beta aperture values, and, therefore, of the overall aperture weighting.

It is further preferred that the imaging system comprises a redundant detection values determination unit for determining redundant detection values, wherein the beta determination unit is adapted for determining the beta aperture weighting values of a group by interpolation such that the beta aperture weighting values for corresponding redundant detection values are normalized. According to this embodiment, a further normalization of the beta aperture weighting values is not necessary, further reducing the computational cost of the aperture weighting procedure.

It is further preferred that the grouping unit is adapted such that each group comprises at least two alpha detection values, wherein the imaging system is adapted such that the at least two alpha detection values of each group comprise the first and the last detection values with respect to the different directions. Since these two alpha detection values cover the whole range of different directions of the respective group, the use of the corresponding alpha aperture values for determining the beta aperture values yields beta aperture values, which further improve the quality of the finally reconstructed image.

In an embodiment, the imaging system further comprises a motion detection unit for detecting motion within the region of interest, wherein the detection values are weighted with respect to the detected motion. This allows to consider motion within the region of interest during reconstruction. This further improves the quality of the finally reconstructed image, if moving elements are present within the region of interest, for example if, a human heart or a part of a human heart is present within the region of interest.

In a further aspect of the present invention an image generation device for generating an image of a region of interest from detection values is presented, the detection values being generated from a cone beam after having traversed the region of interest, the cone beam being generated by an illumination unit for illuminating the region of interest from different directions, wherein the image generation unit comprises:

a grouping unit for grouping detection values from different directions, wherein each group comprises at least one alpha detection value and at least one beta detection value, an alpha determination unit for determining at least one alpha aperture weighting value for the at least one alpha detection value of a group, using at least one position of at least one ray within the aperture, which corresponds to the at least one alpha detection value, a beta determination unit for approximately determining at least one beta aperture weighting value for the at least one beta detection value of a group using the at least one alpha aperture weighting value of the group, an aperture weighting unit for aperture weighting the detection values using the determined at least one alpha and at least one beta aperture weighting values, a reconstruction unit for reconstructing the region of interest by backprojecting the weighted detection values.

In a further aspect of the present invention an imaging method for imaging a region of interest is presented, wherein the imaging method comprises following steps:

generating a cone beam for illuminating the region of interest from different directions by an illumination unit, generating detection values from the cone beam after having traversed the region of interest by a detection unit, grouping detection values from different directions, wherein each group comprises at least one alpha detection value and at least one beta detection value by a grouping unit, determining at least one alpha aperture weighting value for the at least one alpha detection value of a group by using at least one position of at least one ray within the aperture, which corresponds to the at least one alpha detection value, by an alpha determination unit, approximately determining at least one beta aperture weighting value for the at least one beta detection value of a group using the at least one alpha aperture weighting value of the group by a beta determination unit, aperture weighting the grouped detection values using the determined at least one alpha and at least one beta aperture weighting values by an aperture weighting unit, reconstructing the region of interest by backprojecting the weighted detection values by a reconstruction unit.

In a further aspect of the invention an image generation method for generating an image of a region of interest from detection values is presented, the detection values being generated from a cone beam after having traversed the region of interest, the cone beam being generated by an illumination unit for illuminating the region of interest from different directions, wherein the image generation method comprises following steps:

grouping detection values from different directions, wherein each group comprises at least one alpha detection value and at least one beta detection value, determining at least one alpha aperture weighting value for the at least one alpha detection value of a group, using at least one position of at least one ray within the aperture, which corresponds to the at least one alpha detection value, approximately determining at least one beta aperture weighting value for the at least one beta detection value of a group using the at least one alpha aperture weighting value of the group, aperture weighting the grouped detection values, wherein the aperture weighting unit is adapted for weighting the detection values using the determined at least one alpha and at least one beta aperture weighting values, reconstructing the region of interest by backprojecting the weighted detection values.

In a further aspect of the present invention a computer program for imaging a region of interest is presented, wherein the computer program comprises program codes means for causing an imaging system to carry out the steps of the method as claimed in claim 10, when the computer program is run on a computer controlling an imaging system as claimed in claim 1.

In a further aspect of the invention a computer program for generating an image of a region of interest is presented, wherein the computer program comprises program code means for causing a computer to carry out the steps of the method as claimed in claim 8, when the computer program is run on a computer controlling an image generation device as claimed in claim 6.

Preferred embodiments of the invention are defined in the dependent claims. It shall be understood that the imaging system of claim 1, the image generation device of claim 6 the imaging method of claim 7, the image generation method of claim 8, the computer program of claim 9 and the computer program of claim 10 have similar and/or identical preferred embodiments as defined in the dependent claims.

It shall be understood that preferred embodiment of the invention can also be combinations of the dependent claims with the respective independent claim.

BRIEF DESCRIPTION OF THE DRAWINGS

These and other aspects of the invention will be apparent from and elucidated with reference to the embodiment described hereinafter. In the following drawings

DETAILED DESCRIPTION OF EMBODIMENTS

Figure 1:
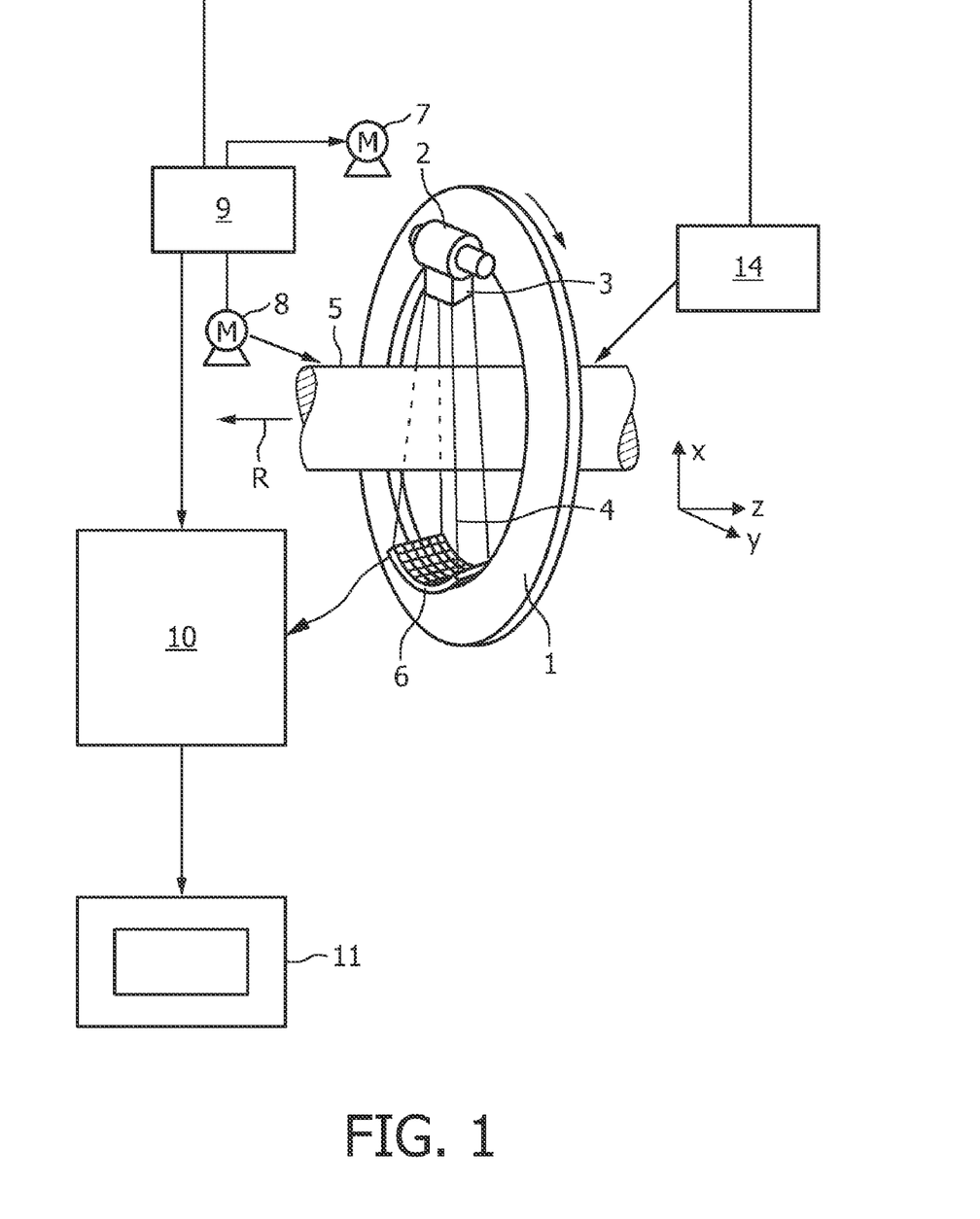
FIG. 1 shows schematically an embodiment of an imaging system for imaging a region of interest in accordance with the invention.

FIG. 1 shows an imaging system, which is in this embodiment a CT system. The CT system includes a gantry 1 which is capable of rotation about an axis of rotation R which extends parallel to the z direction. The illumination unit 2, which is in this embodiment an X-ray tube 2, is mounted on the gantry 1. The X-ray tube is provided with a collimator device 3, which forms a conical radiation beam 4 (cone beam) from the radiation generated by the X-ray tube 2. The radiation traverses an object (not shown), such as a patient, in a region of interest in a cylindrical examination zone 5. After having traversed the examination zone 5, the X-ray beam 4 is incident on an X-ray detection unit 6, which is a two-dimensional detector mounted on the gantry 1.

The gantry 1 is driven at a preferably constant but adjustable angular speed by a motor 7. A further motor 8 is provided for displacing the object, e.g., a patient who is arranged on a patient table in the examination zone 5, parallel to the direction of the axis of rotation R or the z-axis. These motors 7, 8 are controlled by a control unit 9, for instance, such that the illumination unit 2 and the examination zone 5 move relative to each other along a helical trajectory. However, it is also possible that the object or the examination zone 5 is not moved, but that only the X-ray tube 2 is rotated, i.e., that the illumination unit 2 and the examination zone 5 move relative to each other along a circular trajectory.

The motors 7, 8, the gantry 1 and preferentially a patient table form a moving unit, which allows the region of interest to be illuminated from different directions by the illumination unit 2.

The data acquired by the detection unit 6, which are detection values, are provided to an image generation device 10 for generating an image of the region of interest. The reconstructed image can finally be provided to a display 11 for displaying the image. Also the image generation device 10 is preferably controlled by the control unit 9. Alternatively or in addition, the image generation device 10 can comprise a control unit for controlling the image generation device 10 only.

Figure 2:
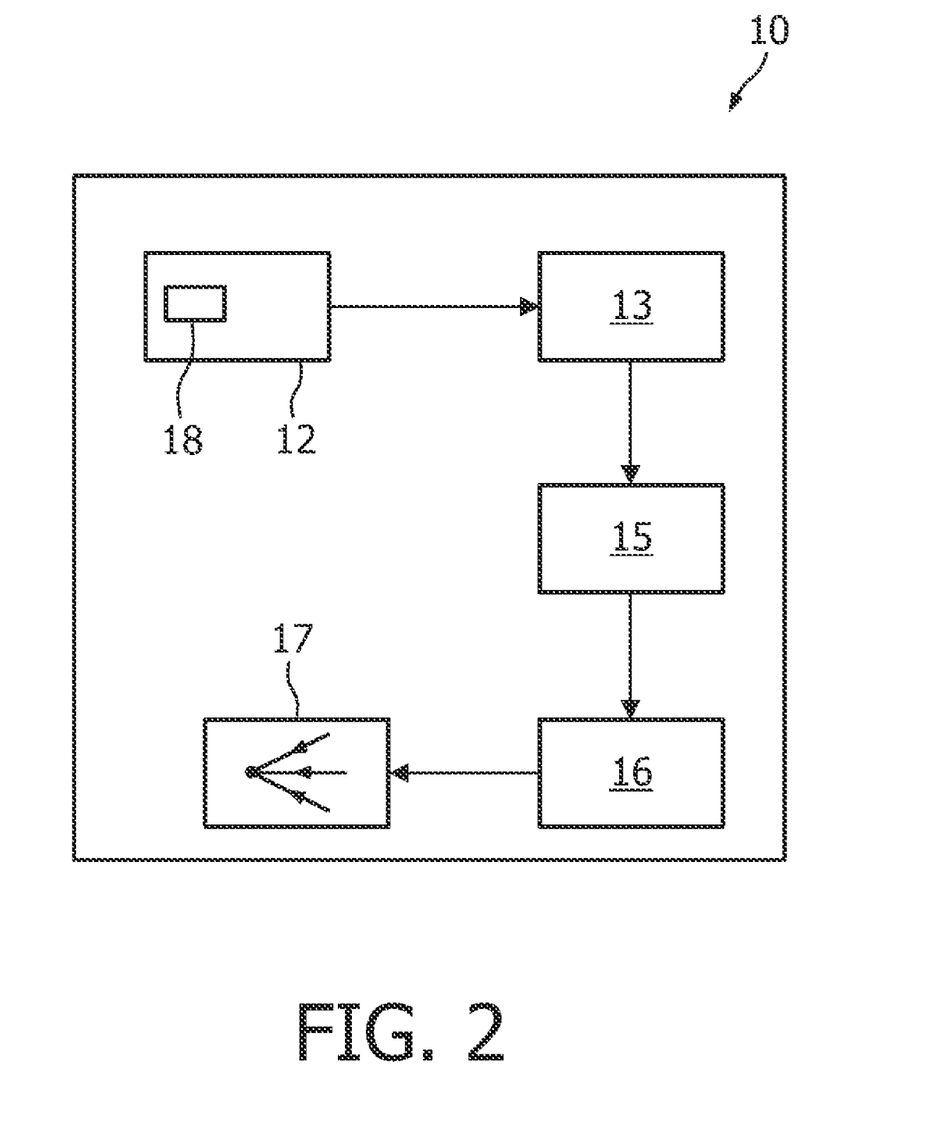
FIG. 2 shows schematically an embodiment of an image generation device in accordance with the invention.

The image generation device 10 is schematically shown in FIG. 2 and comprises a grouping unit 12, an alpha determination unit 13, a beta determination unit 15, an aperture weighting unit 16 and a reconstruction unit 17.

The grouping unit 12 is adapted for grouping detection values from different directions, i.e. preferentially for grouping detection values from different projections, wherein each group comprises at least two detection values and beta detection values. Therefore, each group comprises preferentially at least two alpha detection values from different projections and beta detection values from different projections so that each value of a group corresponds to a different projection.

In another embodiment, the grouping unit can be adapted such that a group comprises one alpha detection value and at least one further beta detection value. In this case, for the alpha detection value of the group an alpha aperture weighting value is determined, and the beta determination unit can be adapted such that the at least one beta aperture weighting value is equal to the alpha aperture weighting value of the respective group.

The alpha determination unit 13 is adapted for determining alpha aperture weighting values for the at least two alpha detection values of a group, using positions of rays within the aperture, which correspond to the at least two alpha detection values. The determination of the alpha aperture weighting values can be performed, for example, as described in US 2004/0076265 A1, which is herewith incorporated by reference. A preferred determination of alpha aperture weighting values will be described further below.

The beta determination unit 15 is adapted for approximately determining beta aperture weighting values for the beta detection values of a group using the alpha aperture weighting values of the group. This approximate determination is preferentially performed by interpolation. This interpolation will also be described in more detail further below.

The aperture weighting unit 16 is adapted for aperture weighting detection values using the determined alpha and beta weighting values. This aperture weighting is preferentially performed by multiplying the detection values by the corresponding alpha or beta aperture weighting values, respectively. The reconstruction unit 17 is adapted for reconstructing the region of interest by backprojecting the weighted detection values.

In this embodiment, the imaging system further comprises a unit 14 for determining motion within the region of interest. If the region of interest comprises moving elements, the unit 14 generates motion values corresponding to the movement of the moving elements within the region of interest. The unit 14 is, for example, an electrocardiograph, which is connected to a patient present in the region of interest, wherein, in particular, the heart or a part of the heart of the patient is present within the region of interest. The motion values generated by the unit 14 are transferred to the image generation device 10, which can use the motion values, in order to improve the quality of the reconstructed images. This will be explained in more detail further below.

Also the unit 14 for determining motion within the region of interest is preferentially controlled by the control unit 9. The motion values can be directly transferred to the image generation device 10 or via the control unit 9.

Figure 3:
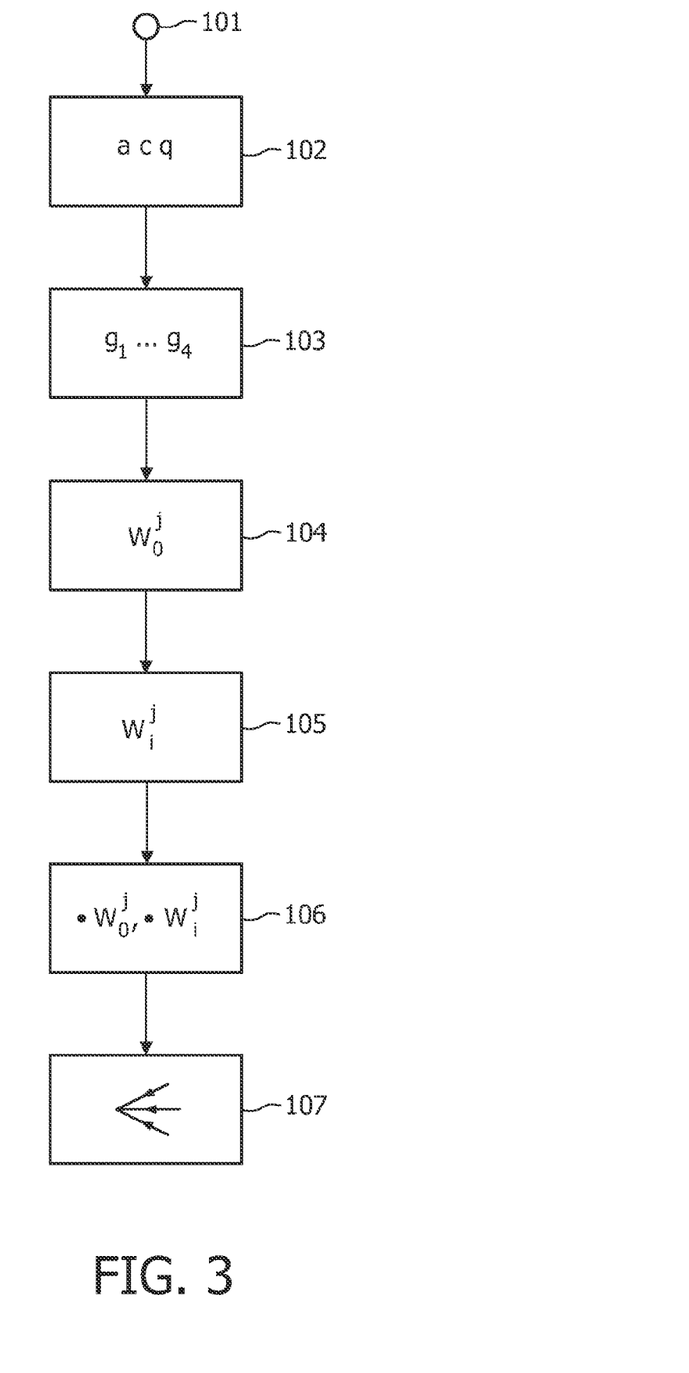
FIG. 3 shows schematically a flowchart illustrating an embodiment of a method for imaging a region of interest in accordance with the invention.

An embodiment of a method for imaging a region of interest in accordance with the invention will now be described in more detail with respect to a flowchart shown in FIG. 3.

After initialization of the imaging system in step 101, detection values are acquired in step 102. In order to acquire the detection values, the X-ray tube 2 rotates around the region of interest, and the region of interest or the object is not moved, i.e. the X-ray tube 2 travels along a circular trajectory around the region of interest. Alternatively, in another embodiment, the X-ray tube 2 rotates around the region of interest, and the region of interest or the object is moved parallel to the z direction, i.e. the X-ray tube 2 travels along a helical trajectory. The region of interest or the object can be moved by moving, for example, a patient table on which the object, for example, a patient, is located.

Since the X-ray tube 2 rotates around the region of interest, the detection values are acquired from different directions.

It is preferred that in step 102 also motion values are acquired by the unit 14 for determining motion within the region of interest. The motion values are, for example, the values of an electrocardiogram which are transferred from the unit 14 to the image generation device 10. The detection values are also transferred to the image generation device 10.

In step 103 a redundant detection values determination unit 18 of the grouping unit 12 determines redundant detection values. The redundant detection value determination unit 18 can also be a separate unit within the image generation device 10 or within the imaging system, i.e. the redundant detection values determination unit has not to be a part of the grouping unit. The redundant detection values are determined for each voxel of the region of interest, which has to be reconstructed. This will now be explained in more detail with respect to FIG. 4.

Figure 4:
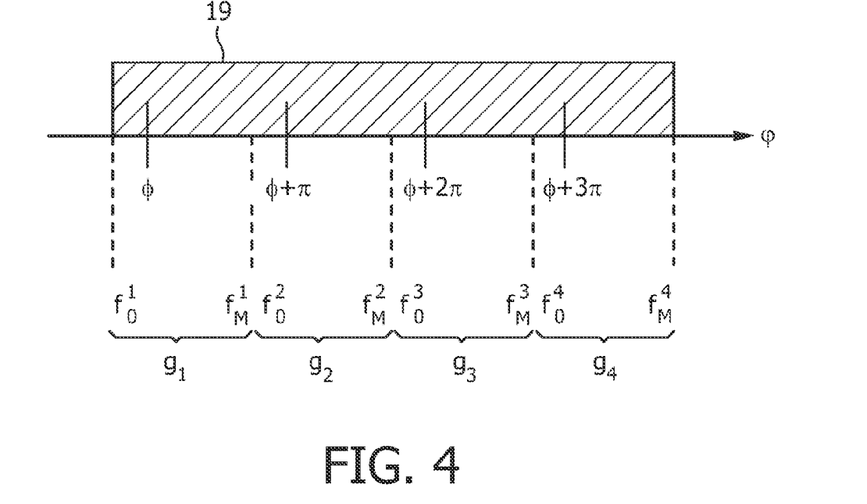
FIG. 4 shows schematically an illumination interval for a voxel of a region of interest, projection angles and groups.

FIG. 4 shows schematically for a voxel of a region of interest an illumination interval 19 in dependence on a projection angle $\phi$. The projection angle $\phi$ is the angle of the ray, which corresponds to a detection value, seen from the respective voxel. In FIG. 4 four projection angles $\phi$, $\phi+\pi$, $\phi+2\pi$ und $\phi+3\pi$ are indicated. The rays, which correspond to these projection angles, illuminate the respective voxel from identical or opposite directions, i.e. the corresponding detection values are redundant.

Furthermore, in step 103 the grouping unit 12 groups the detection values such that the determined redundant detection values are distributed over several groups. This means, in this embodiment, that each group consists of detection values, which are not redundant to each other. For example, with reference to FIG. 4, for a certain voxel the detection value corresponding to the projection angle $\phi$ is put into a first group $g^1$, the detection value corresponding to the projection angle $\phi+\pi$ is put into a second group $g^2$, the detection value corresponding to the projection angle $\phi+2\pi$ is put into a third group $g^3$ and the detection value corresponding to the projection angle $\phi+3\pi$ is put into a fourth group $g^4$.

The invention is not limited to an angular coverage of $\pi$ for each group. Each group can also cover another angular range.

Backprojection is a computational demanding task. Therefore, hardware acceleration is commonly used for this task. In such a dedicated hardware, it is possible to perform the backprojection of several projections in parallel. This parallel processing implies that projection data are preferably grouped in groups of N projections, where N is the number of projections, which the hardware can handle in parallel. Thus, the groups are preferentially generated such that the use of each group, i.e. the detection values of each group, can be backprojected in parallel.

In this embodiment, the detection values within a group being the first and last detection value with respect to the different directions, i.e. with respect to the different projection angles for the respective voxel, are defined as the alpha detection values. The other detection values, which are located between these alpha detection values with respect to the different projection angles for a voxel, are defined as beta detection values.

Preferably but not necessarily, the grouping is performed such that whenever a certain projection at an angle is an alpha detection value of a group, then all redundant projections (at angles $\phi+k\phi$, k being any integer number) shall be an alpha detection value in their groups.

Four different groups $g^1$, $g^2$, $g^3$, $g^4$ are exemplarily shown in FIG. 4. Each of these groups $g_1$, $g^2$, $g^3$, $g^4$ consists of detection values $f_0^1, f_1^1, \ldots f_M^1; f_0^2, f_1^2, \ldots f_M^2; f_0^3, f_1^3, \ldots F_M^3; f_0^4, f_1^4, \ldots f_M^4$, respectively. Each group comprises only non-redundant detection values. The alpha detection values of each group are designated by $f_0^1, f_M^1; f_0^2, f_M^2; f_0^3, f_M^3; f_0^4, f_M^4$, respectively. The detection values between these alpha detection values $f_1^1, \ldots f_{M-1}^1; f_1^2, \ldots f_{M-1}^2; f_1^3, \ldots f_{M-1}^3; f_1^4, \ldots f_{M-1}^4$ are the beta detection values, respectively.

The grouping unit 12 defines for each voxel within the region of interest groups of detection values comprising the at least two alpha detection values and the beta detection values.

In step 104 the alpha determination unit 13 determines alpha aperture weighting values for the alpha detection values $f_0^1, f_M^1; f_0^2, f_M^2; f_0^3, f_M^3; f_0^4, f_M^4$ of each group, wherein positions of rays within the aperture are used, which correspond to the alpha detection values $f_0^1, f^1; f_0^2, f_m^2; f_0^3, f_M^3; f_0^4, f_M^4$. For determining an alpha aperture weighting value for an alpha detection value, detection values are considered, which are redundant with respect to the alpha detection value. For example, in order to determine an alpha aperture weighting value for the alpha detection value $f_0^1$ the detection values $f_0^2, f_0^3, f^0{}_4$ are considered, because the projection angles corresponding to these detection values differ by an angle being a multiple of it, i.e. these detection values $f_0^1, f_0^2, f_0^3, f_0^4$ are redundant to each other.

The determination of the alpha detection values will in the following be described with reference to FIG. 5.

Figure 5:
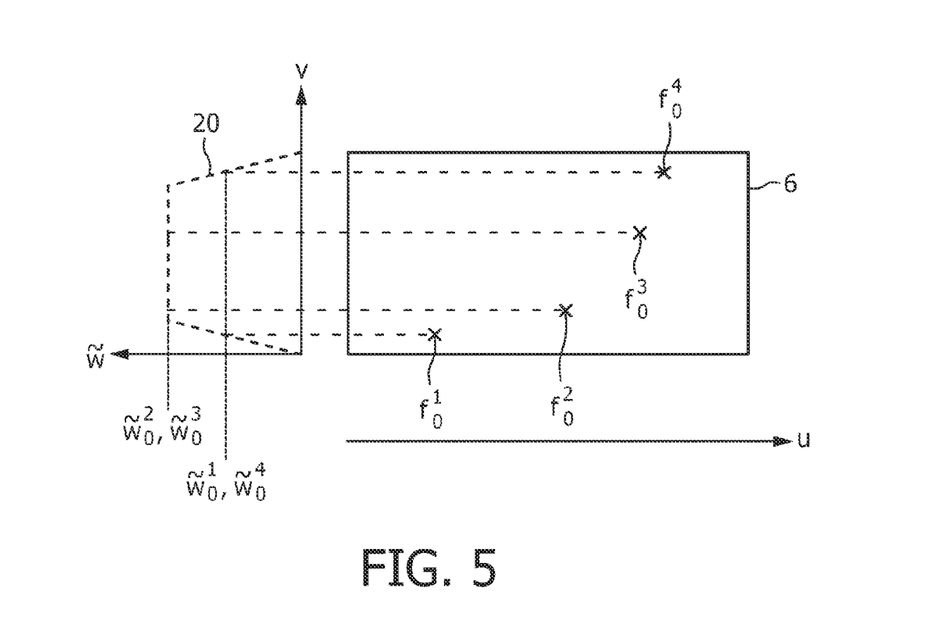
FIG. 5 shows schematically a two-dimensional detector on which positions of detection values are illustrated, and an aperture weighting function.

FIG. 5 shows schematically the two-dimensional detector 6 on which the positions of the detection values $f_0^1, f_0^2, f_0^3, f_0^4$ are indicated for the respective voxel within the region of interest. The position on the detector 6 can be defined by using the coordinate system having a v-axis parallel to the z-axis or to the axis of rotation and a u-axis perpendicular to the v-axis.

The detection values $f_0^1, f_0^2, f_0^3, f_0^4$ are redundant to each other. Therefore, if the alpha aperture weighting value has to be determined for one of these alpha detection values, the other of these detection values can be regarded as redundancy values. The rays which correspond to these redundancy values and to the respective alpha detection value can be regarded as redundancy rays. The position of these redundancy rays is used to determine the position of the respective alpha detection values and redundancy values on the detector 6. The positions of the alpha detection values $f_0^1, f_0^2, f_0^3, f_0^4$ with respect to the v-axis, i.e. the v-position of the alpha detection values are mapped to an aperture weighting function 20, in order to determine non-normalized alpha aperture weighting values $\tilde{w}_0^1, \tilde{w}_0^2, \tilde{w}_0^3, \tilde{w}_0^4$. The aperture weighting function 20 depends on the position of the alpha detection values on the detector 6 with respect to the v-axis, i.e. depends on the angular orientation of the corresponding rays within the aperture in the direction of the v-axis. This aperture weighting function 20 is defined such that to alpha detection values and redundancy values in the middle of the aperture larger aperture weighting values are assigned than to alpha detection values and redundancy values, which are located at the outermost position with respect to the aperture, i.e. with respect to the v-axis.

After non-normalized alpha aperture weighting values $\tilde{w}_0^1, \tilde{w}_0^2, \tilde{w}_0^3, \tilde{w}_0^4$, have been determined, these non-normalized aperture weighting values $\tilde{w}_0^1, \tilde{w}_0^2, \tilde{w}_0^3, \tilde{w}_0^4$, are normalized using following equation:

$$w_0^j = \frac{\tilde{w}_0^j}{\sum_j \tilde{w}_0^j} \quad (1)$$

In this equation $w_{01}$ is the normalized alpha aperture weighting value of the alpha detection value $f_0^j$, wherein in this embodiment j can have the values from one to four. These alpha aperture weighting values $w_0^j$ will be used for the aperture weighting. The alpha aperture weighting values of the alpha detection value $f_M^1, f_M^2, f_M^3, f_M^4$ are determined in the same way as the alpha detection value $f_0^1, f_0^2, f_0^3, f_0^4$. Therefore, also for the alpha detection values $f_M^1, f_M^2, f_M^3, f_M^4$ the positions on the detector 6 with respect to v-axis are determined, these positions are mapped to the aperture weighting function and the resulting non-normalized alpha aperture weighting values $\tilde{w}_M^1, \tilde{w}_M^2, \tilde{w}_M^3, \tilde{w}_M^4$ are normalized by using following equation:

$$w_M^j = \frac{\tilde{w}_M^j}{\sum_j \tilde{w}_M^j} \quad (2)$$

wherein $w_M^j$ designates the alpha aperture weighting values of the alpha detection values $f_M^1, f_M^2, f_M^3, f_M^4$, which will be used for aperture weighting.

In step 105 the beta determination unit 15 determines for each group beta aperture weighting values for the beta detection values of the respective group approximately by using the alpha aperture weighting values of the respective group. This approximate determination is preferentially performed by interpolation using the determined alpha aperture weighting values of the respective group. For the group $g^j$ the beta aperture weighting values $w_i^j$ with i=1, ..., M-1 are determined in accordance with following equation:

$$w_i^j = w_0^j + \frac{i}{M}(w_M^j - w_0^j). \quad (3)$$

This interpolation can be performed with low computational cost, and the resulting beta aperture weighting values $w_i^j$ are normalized, i.e. the interpolation is performed such that the beta aperture weighting values $w_i^j$ are normalized.

In step 106 the detection values of each group are aperture weighted by the aperture weighting unit 16 using the determined alpha and beta weighting values, i.e., in this embodiment, the detection values are multiplied by the corresponding alpha and beta weighting values, respectively.

In order to consider motion values indicating a motion within the region of interest, the detection values can further be weighted with respect to the motion values which have been acquired at the same time as their corresponding detection values. This weighting is preferentially performed by multiplying the detection values by motion weighting values, which depend on the motion values. For example, if a human heart is located within the region of interest, the motion weighting values can be determined by the following procedure: The electrocardiogram data provide information about a characteristic point in the cardiac cycle, e.g. the so-called R-peak, which is related to the start of the contraction of the ventricle. Typically, the cardiologist or radiologist selects a desired phase point within the cardiac cycle, where an image should be generated. The best position depends on the patients heart rate. Given this desired phase point as input, the required data for this task are selected retrospectively from the multitude of acquired data. This is, for example, disclosed in Manzke et al., Medical Physics 30(12), pp 3072-3080, (2003), which is incorporated herewith by reference. This subset of data contains projections, i.e. detection values, taken exactly at the desired phase point, but also projections taken at others. In order to reflect this variation in the temporal distance of the acquisition time of each projection to the desired time, a motion weighting is employed that gives high weights to detection values taken at times close to the desired heart phase and smaller weights for detection values taken at times having a larger temporal distance to the desired heart phase.

In step 107 the reconstruction unit reconstructs the region of interest by backprojecting the weighted detection values. This backprojection can be performed by using any suitable backprojection algorithm. For example, the filtered backprojection method described in Koken and Grass, Phys. Med. Biol. 51, pp 3433-3448 (2006) can be used for reconstructing the region of interest in step 107.

While the invention has been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure, and the appended claims.

In the above described embodiment the grouping step 103 is performed immediately after the acquisition step 102. Nevertheless, the grouping step 103 can also be performed between steps 104 and 105. It is preferred that the grouping step is performed before the step of determining the beta aperture weighting values 105.

In the claims, the word "comprising" does not exclude other elements or steps, and the indefinite article "a" or "an" does not exclude a plurality. A single unit or several units may fulfill the functions of several items recited in the claims. The mere fact that certain measures are recited in mutually different dependent claims does not indicate that a combination of these measures cannot be used to advantage.

The different units of the image generation device can be realized by program code means for running on an appropriate computer system or by dedicated hardware. Some or all of the above described units can be implemented by one or several suitably programmed processors or by one or several suitably structured hardware components.

In accordance with the invention, preferentially all detection values, which are intended to be used for reconstructing the region of interest are grouped into several groups, wherein each group comprises at least two alpha detection values and beta detection values and wherein the determination of the alpha aperture weighting values and the beta aperture weighting values is performed for each of these groups. Each detection value, which is intended to be used for reconstruction, is than aperture weighted using the determined alpha aperture weighting values and beta aperture weighting values, and the aperture weighted detection values are used for reconstructing the region of interest.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An imaging system for imaging a region of interest, comprising:
   an illumination unit for generating a cone beam for illuminating the region of interest from different directions,
   a detection unit for generating detection values from the cone beam after having traversed the region of interest,
   a grouping unit for grouping detection values from different directions, wherein each group comprises at least one alpha detection value and at least one beta detection value,
   an alpha determination unit for determining at least one alpha aperture weighting value for the at least one alpha detection value of a group, using at least one position of at least one ray within the aperture, which corresponds to the at least one alpha detection value, wherein the alpha determination unit is adapted for determining the at least one alpha aperture weighting value for the at least one alpha detection value in accordance with the following steps:
      determining redundancy values which are redundant to the at least one alpha detection value,
      determining positions of redundancy rays, which correspond to the at least one alpha detection value and the redundancy values,
      assigning an aperture weighting value to each of the at least one alpha detection value and the redundancy values with respect to the determined positions of the redundancy rays, and
      normalizing the assigned aperture weighting values, the normalized aperture weighting value assigned to the at least one alpha detection value being the at least one alpha aperture weighting value for the at least one alpha detection value;
   a beta determination unit for approximately determining at least one beta aperture weighting value for the at least one beta detection value of a group using the at least one alpha aperture weighting value of the group,
   an aperture weighting unit for aperture weighting the detection values using the determined at least one alpha and at least one beta aperture weighting values, a reconstruction unit for reconstructing the region of interest by backprojecting the weighted detection values,
   wherein the grouping unit is adapted such that each group comprises at least two alpha detection values and wherein the imaging system is adapted such that the at least two alpha detection values of each group comprise the first and the last detection values with respect to the different directions, and
   wherein the grouping unit is adapted such that each group comprises at least one beta detection value which is located between the at least two alpha detection values, and
   wherein the beta determination unit is adapted for determining the at least one beta aperture weighting value of a group by interpolation using the alpha aperture weighting values of the group.

2. The imaging system as claimed in claim 1, wherein the imaging system comprises a redundant detection values determination unit for determining redundant detection values and wherein the grouping unit is adapted for grouping the detection values such that the determined redundant detection values are distributed over several groups.

3. The imaging system as claimed in claim 1, wherein the alpha determination unit is adapted for assigning an aperture weighting value by using an aperture weighting function, wherein the aperture weighting function is defined such that to alpha detection values and redundancy values in the middle of the aperture larger aperture weighting values are assigned and that to the outermost alpha detection values and redundancy values with respect to the aperture smaller aperture weighting values are assigned.

4. The imaging system as claimed in claim 1, wherein the imaging system comprises a redundant detection values determination unit for determining redundant detection values and wherein the beta determination unit is adapted for determining at least one of the beta aperture weighting values of a group by interpolation such that the at least one beta aperture weighting value for corresponding redundant detection values is normalized.

5. The imaging system as claimed in claim 1, wherein the imaging system further comprises a motion detection unit for detecting motion within the region of interest and wherein the detection values are weighted with respect to the detected motion.

6. An image generation device for generating an image of a region of interest from detection values, the detection values being generated from a cone beam after having traversed the region of interest, the cone beam being generated by an illumination unit for illuminating the region of interest from different directions, wherein the image generation unit comprises:
   a grouping unit for grouping detection values from different directions, wherein each group comprises at least one alpha detection value and at least one beta detection value,
   an alpha determination unit for determining at least one alpha aperture weighting value for the at least one alpha detection value of a group, using at least one position of at least one ray within the aperture, which corresponds to the at least one alpha detection value, wherein the alpha determination unit is adapted for determining the at least one alpha aperture weighting value for the at least one alpha detection value in accordance with the following steps:
      determining redundancy values which are redundant to the at least one alpha detection value, determining positions of redundancy rays, which correspond to the at least one alpha detection value and the redundancy values, assigning an aperture weighting value to each of the at least one alpha detection value and the redundancy values with respect to the determined positions of the redundancy rays, normalizing the assigned aperture weighting values, the normalized aperture weighting value assigned to the at least one alpha detection value being the at least one alpha aperture weighting value for the at least one alpha detection value;

a beta determination unit for approximately determining at least one beta aperture weighting value for the at least one beta detection value of a group using the at least one alpha aperture weighting value of the group, an aperture weighting unit for aperture weighting the detection values using the determined at least one alpha and at least one beta aperture weighting values, a reconstruction unit for reconstructing the region of interest by backprojecting the weighted detection values, wherein the grouping unit is adapted such that each group comprises at least two alpha detection values and wherein the imaging system is adapted such that the at least two alpha detection values of each group comprise the first and the last detection values with respect to the different directions, and wherein the grouping unit is adapted such that each group comprises at least one beta detection value which is located between the at least two alpha detection values, and wherein the beta determination unit is adapted for determining the at least one beta aperture weighting value of a group by interpolation using the alpha aperture weighting values of the group.

7. An imaging method for imaging a region of interest, comprising following steps:

generating a cone beam for illuminating the region of interest from different directions by an illumination unit, generating detection values from the cone beam after having traversed the region of interest by a detection unit, grouping detection values from different directions, wherein each group comprises at least one alpha detection value and at least one beta detection value by a grouping unit, determining at least one alpha aperture weighting value for the at least one alpha detection value of a group by an alpha determination unit using at least one position of at least one ray within the aperture, which corresponds to the at least one alpha detection value, by an alpha determination unit, wherein the at least one alpha aperture weighting value for the at least one alpha detection value is determined in accordance with the following steps:

determining redundancy values which are redundant to the at least one alpha detection value, determining positions of redundancy rays, which correspond to the at least one alpha detection value and the redundancy values, assigning an aperture weighting value to each of the at least one alpha detection value and the redundancy values with respect to the determined positions of the redundancy rays, normalizing the assigned aperture weighting values, the normalized aperture weighting value assigned to the at least one alpha detection value being the at least one alpha aperture weighting value for the at least one alpha detection value;

approximately determining at least one beta aperture weighting value for the at least one beta detection value of a group using the at least one alpha aperture weighting value of the group by a beta determination unit, aperture weighting the grouped detection values using the determined at least one alpha and at least one beta aperture weighting values by an aperture weighting unit, reconstructing the region of interest by backprojecting the weighted detection values by a reconstruction unit, wherein each group comprises at least two alpha detection values and wherein the at least two alpha detection values of each group comprise the first and the last detection values with respect to the different directions, and wherein each group comprises at least one beta detection value which is located between the at least two alpha detection values, and wherein the at least one beta aperture weighting value of a group is determined by interpolation using the alpha aperture weighting values of the group.

8. An image generation method for generating an image of a region of interest from detection values, the detection values being generated from a cone beam after having traversed the region of interest, the cone beam being generated by an illumination unit for illuminating the region of interest from different directions, wherein the image generation method comprises following steps:

grouping detection values from different directions, wherein each group comprises at least one alpha detection value and at least one beta detection value, determining at least one alpha aperture weighting value for the at least one alpha detection value of a group, using at least one position of at least one ray within the aperture, which corresponds to the at least one alpha detection value, wherein the at least one alpha aperture weighting value for the at least one alpha detection value is determined in accordance with the following steps:

determining redundancy values which are redundant to the at least one alpha detection value, determining positions of redundancy rays, which correspond to the at least one alpha detection value and the redundancy values, assigning an aperture weighting value to each of the at least one alpha detection value and the redundancy values with respect to the determined positions of the redundancy rays, normalizing the assigned aperture weighting values, the normalized aperture weighting value assigned to the at least one alpha detection value being the at least one alpha aperture weighting value for the at least one alpha detection value;

approximately determining at least one beta aperture weighting value for the at least one beta detection value of a group using the at least one alpha aperture weighting value of the group, aperture weighting the grouped detection values using the determined at least one alpha and at least one beta aperture weighting values, reconstructing the region of interest by backprojecting the weighted detection values, wherein each group comprises at least two alpha detection values and wherein the at least two alpha detection values of each group comprise the first and the last detection values with respect to the different directions, and wherein each group comprises at least one beta detection value which is located between the at least two alpha detection values, and wherein the at least one beta aperture weighting value of a group is determined by interpolation using the alpha aperture weighting values of the group.

9. A computer program for imaging a region of interest, comprising program code means for causing an imaging system to carry out the steps of the method as claimed in claim 7, when the computer program is run on a computer controlling an imaging system.

10. Computer program for generating an image of a region of interest, comprising program code means for causing a computer to carry out the steps of the method as claimed in claim 8, when the computer program is run on a computer controlling an image generation device.

* * * * *